Figure 1:
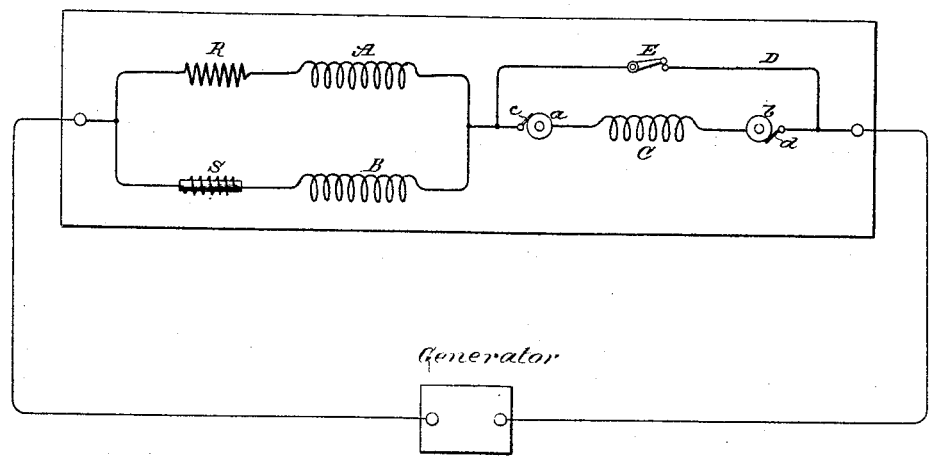

(No Model.)  2 Sheets—Sheet 1.

N. TESLA.
METHOD OF OPERATING ELECTRO MAGNETIC MOTORS.

No. 416,192.  Patented Dec. 3, 1889.

Witnesses:
Raphael Netter
Robt. F. Gaylord

Inventor
Nikola Tesla
By Duncan, Curtis & Page
Attorneys.

(No Model.)　　　　　　N. TESLA.　　　　2 Sheets—Sheet 2.
METHOD OF OPERATING ELECTRO MAGNETIC MOTORS.

No. 416,192.　　　　　　　　Patented Dec. 3, 1889.

Witnesses:
Raphael Netter
Frank E. Hartley

Inventor
Nikola Tesla
By
Duncan, Curtis & Page
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

METHOD OF OPERATING ELECTRO-MAGNETIC MOTORS.

SPECIFICATION forming part of Letters Patent No. 416,192, dated December 3, 1889.

Application filed May 20, 1889. Serial No. 311,414. (No model.)

*To all whom it may concern:*

Be it known that I, NIKOLA TESLA, a subject of the Emperor of Austria, from Smiljan, Lika, border country of Austria-Hungary, and a resident of New York, in the county and State of New York, have invented certain new and useful Improvements in Methods of Operating Electro-Magnetic Motors, of which the following is a specification, reference being had to the drawings accompanying and forming a part of the same.

In a patent granted to me April 16, 1889, No. 401,520, I have shown and described a method of starting and operating synchronizing motors which involved the transformation of the motor from a torque to a synchronizing motor. This I have heretofore done by a change of the circuit-connections, whereby on the start the poles or resultant attraction of the field-magnets of the motor were shifted or rotated by the action of the current until the motor reached synchronous speed, after which the poles were merely alternated. The present application is based upon another way of accomplishing this result, the main features being as follows: If an alternating current be passed through the field-coils only of a motor having two energizing-circuits of different self-induction and the armature-coils be short-circuited, the motor will have a strong torque, but little or no tendency to synchronism with the generator; but if the same current which energizes the field be passed also through the armature-coils the tendency to remain in synchronism is very considerably increased. This is due to the fact that the maximum magnetic effects produced in the field and armature more nearly coincide. This principle discovered by me I have utilized in the operation of motors. In other words, I construct a motor having independent field-circuits of different self-induction, which are joined in derivation to a source of alternating currents. The armature I wind with one or more coils, which are connected with the field-coils through contact rings and brushes, and around the armature-coils I arrange a shunt with means for opening or closing the same. In starting this motor I close the shunt around the armature-coils, which will therefore be in closed circuit. When the current is directed through the motor, it divides between the two circuits, (it is not necessary to consider any case where there are more than two circuits used,) which, by reason of their different self-induction, secure a difference of phase between the two currents in the two branches that produces a shifting or rotation of the poles. By the alternations of current other currents are induced in the closed—or short-circuited—armature-coils and the motor has a strong torque. When the desired speed is reached, the shunt around the armature-coils is opened and the current directed through both armature and field coils. Under these conditions the motor has a strong tendency to synchronism.

In the drawings hereto annexed I have illustrated several modifications of the plan above set forth for operating motors. The figures are diagrams, and will be explained in their order.

Figure 1: A and B designate the field-coils of the motor. As the circuits including these coils are of different self-induction, I have represented this by a resistance-coil R in circuit with A, and a self-induction coil S in circuit with B. The same result may of course be secured by the winding of the coils. C is the armature-circuit, the terminals of which are rings $a\ b$. Brushes $c\ d$ bear on these rings and connect with the line and field circuits. D is the shunt or short circuit around the armature. E is the switch therein. The operation of these devices I have stated above.

It will be observed that in such a disposition as is illustrated in Fig. 1, the field-circuits A and B being of different self-induction, there will always be a greater lag of the current in one than the other, and that, generally, the armature phases will not correspond with either, but with the resultant of both. It is therefore important to observe the proper rule in winding the armature. For instance, if the motor have eight poles—four in each circuit—there will be four resultant poles, and hence the armature-winding should be such as to produce four poles, in order to constitute a true synchronizing motor.

Figure 2:
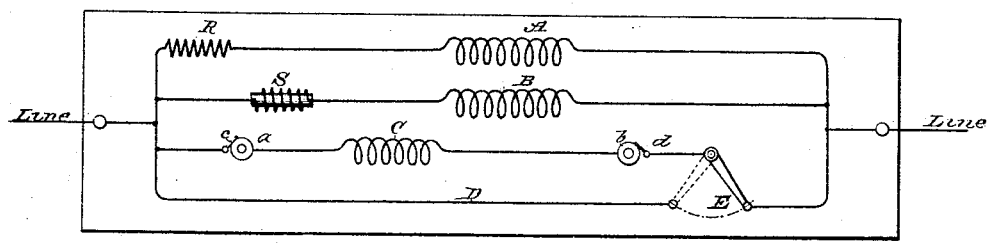
Figure 3:
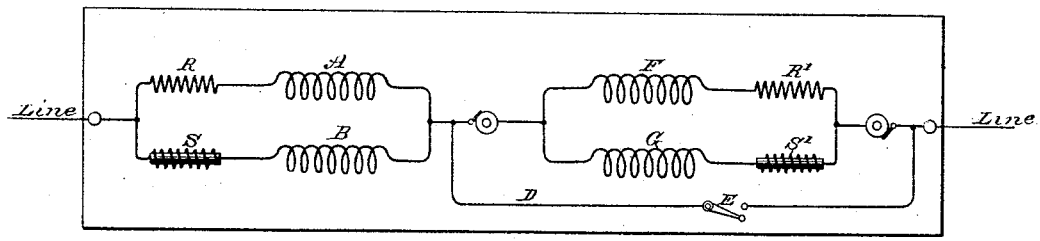
Figure 4:
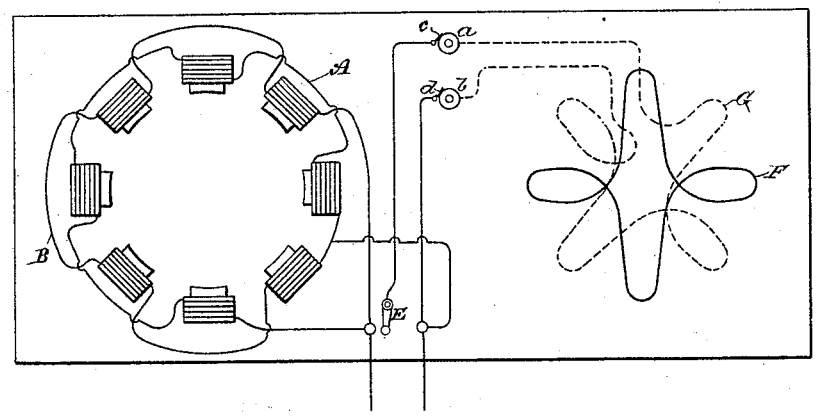
Figure 5:
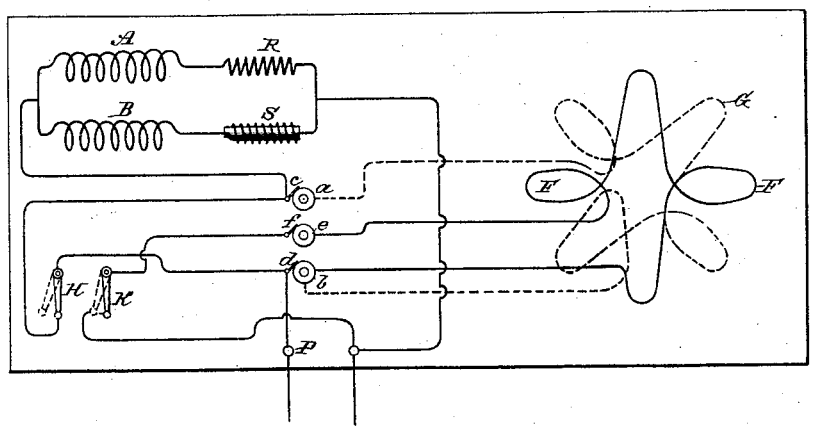

Fig 2: This diagram differs from the previous one only in respect to the order of connections. In the present case the armature-coil, instead of being in series with the field-coils, is in multiple arc therewith. The armature-winding may be similar to that of the field—that is to say, the armature may have two or more coils wound or adapted for different self-induction and adapted, preferably, to produce the same difference of phase as the field-coils. On starting the motor the shunt is closed around both coils. This is shown in Fig. 3, in which the armature-coils are F G. To indicate their different electrical character, I have shown in circuit with them, respectively, the resistance R' and the self-induction coil S'. The two armature coils are in series with the field-coils and the same disposition of the shunt or short circuit D is used. It is of advantage in the operation of motors of this kind to construct or wind the armature in such manner that when short-circuited on the start it will have a tendency to reach a higher speed than that which synchronizes with the generator. For example, a given motor having, say, eight poles should run, with the armature-coil short-circuited, at two thousand revolutions per minute to bring it up to synchronism. It will generally happen, however, that this speed is not reached, owing to the fact that the armature and field currents do not properly correspond, so that when the current is passed through the armature (the motor not being quite up to synchronism) there is a liability that it would not "hold on," as it is termed. I therefore prefer to so wind or construct the motor that on the start, when the armature-coils are short-circuited, the motor will tend to reach a speed higher than the synchronous—as, for instance, double the latter. In such case the difficulty above alluded to is not felt, for the motor will always hold up to synchronism if the synchronous speed—in the case supposed of two thousand revolutions—is reached or passed. This may be accomplished in various ways; but for all practical purposes the following will suffice: I wind on the armature two sets of coils. On the start I short-circuit one only, thereby producing a number of poles on the armature, which will tend to run the speed up above the synchronous limit. When such limit is reached or passed, the current is directed through the other coil, which, by increasing the number of armature-poles, tends to maintain synchronism. In Fig. 4 such a disposition is shown. The motor having, say, eight poles contains two field-circuits A and B, of different self-induction. The armature has two coils F and G. The former is closed upon itself, the latter connected with the field and line through contact-rings $a\ b$, brushes $c\ d$, and a switch E. On the start the coil F alone is active and the motor tends to run at a speed above the synchronous; but when the coil G is connected to the circuit the number of armature-poles is increased, while the motor is made a true synchronous motor. This disposition has the advantage that the closed armature-circuit imparts to the motor torque when the speed falls off, but at the same time the conditions are such that the motor comes out of synchronism more readily. To increase the tendency to synchronism, two circuits may be used on the armature, one of which is short-circuited on the start and both connected with the external circuit after the synchronous speed is reached or passed. This disposition is shown in Fig. 5. There are three contact-rings $a\ b\ e$ and three brushes $c\ d\ f$, which connect the armature-circuits with the external circuit. On starting, the switch H is turned to complete the connection between one binding-post P and the field-coils. This short-circuits one of the armature-coils, as G. The other coil F is out of circuit and open. When the motor is up to speed, the switch H is turned back, so that the connection from binding-post P to the field-coils is through the coil G, and switch K is closed, thereby including coil F in multiple arc with the field-coils. Both armature-coils are thus active.

From the above-described instances it is evident that many other dispositions for carrying out the invention are possible.

I do not claim herein the method and means described and shown for operating a motor by producing artificially a difference of current phase in its independent energizing-circuits; nor do I claim, broadly, a motor having independent energizing-circuits of different self-induction and armature-circuits connected therewith, as these features are made subjects of other applications which I have filed.

What I claim is—

1. The method herein described of operating alternating-current motors having independent energizing-circuits, which consists in short-circuiting the armature circuit or circuits until the motor has reached or passed a synchronizing speed and then connecting said armature-circuits with the external circuit, as set forth.

2. The method of operating alternating-current motors having field-coils of different self-induction, which consists in directing alternating currents from an external source through the field-circuits only until the motor has reached a given speed and then directing said currents through both the field-circuits and one or more of the armature-circuits, as set forth.

3. The method of operating alternating-current motors having field-coils of different self-induction, which consists in directing alternating currents from an external source through the field-circuits and short-circuiting a part of the armature-circuits, and then when the motor has attained a given speed directing the alternating currents through both the field and one or more of the armature-circuits, as set forth.

NIKOLA TESLA.

Witnesses:
ROBT. F. GAYLORD,
FRANK E. HARTLEY.